United States Patent [19]
Hamatsu et al.

[11] Patent Number: 4,847,861
[45] Date of Patent: Jul. 11, 1989

[54] MAXIMUM LENGTH LINEARLY OCCURRING CODE SEQUENCE GENERATOR IN A SPREAD SPECTRUM COMMUNICATION SYSTEM

[75] Inventors: Masahiro Hamatsu; Masaharu Mori, both of Tokyo, Japan

[73] Assignee: Clarion Co., Ltd., Tokyo, Japan

[21] Appl. No.: 84,956

[22] Filed: Aug. 13, 1987

[30] Foreign Application Priority Data

Oct. 9, 1986 [JP] Japan .................. 61-241770

[51] Int. Cl.$^4$ .................. G06F 7/58; H04K 1/00
[52] U.S. Cl. .................. 375/1; 380/48
[58] Field of Search .................. 375/1; 380/48

[56] References Cited
U.S. PATENT DOCUMENTS
4,320,513 3/1982 Lampert .................. 375/1

Primary Examiner—Salvatore Cangialosi
Attorney, Agent, or Firm—Flynn, Thiel, Boutell & Tanis

[57] ABSTRACT

A method for determining the initial state of shift registers constituting a modular type or simple construction type maximum length linearly occurring code sequence generator used in a spread spectrum communication system is disclosed, by which it is determined by the following equation;

$$y_j(0) = \begin{vmatrix} q_{11} & & q_{1n} \\ & & \\ \cdots & X & \cdots \\ & & \\ q_{n1} & & q_{nn} \end{vmatrix},$$

where
$y_j(0)$ is the j-th element of $Y(0)$, and
$X = P X(0)$.

3 Claims, 3 Drawing Sheets

MAXIMUM LENGTH LINEARLY OCCURRING CODE SEQUENCE GENERATOR IN A SPREAD SPECTRUM COMMUNICATION SYSTEM

FIELD OF THE INVENTION

This invention relates to a spread spectrum communication (hereinbelow abbreviated to SSC) system, by which demodulation of necessary information is effected by using correlation output between signals whose spectrum is spread by means of a maximum length linearly occurring code sequence (hereinbelow abbreviated to m sequence) generated on the sender side and that generated on the receiver side and in particular to a method for determining the initial state of the m sequence generator.

BACKGROUND OF THE INVENTION

In a direct SSC using a correlator such as a surface acoustic wave (hereinbelow abbreviated to SAW) convolver, as dividing means for a communication channel in the case where an m sequence serves as spreading codes, it is conceivable to utilize not only the sort of the m sequence but also the initial phase of the m sequence both on the sender and the receiver sides. The algorithm for determining the data demodulation timing and the information concerning the initial phase and so forth have been already disclosed by the same applicant of this invention in JP-A-59-2733.

However the result obtained by the algorithm for determining the information concerning the initial phase of the m sequence (hereinbelow called simply initial phase information) can be applied only to the case where a simple construction type m sequence generator is used and no algorithm for determining the initial phase information, which can be applied in a general manner both to the simple construction type and the modular type m sequence generators, were known.

OBJECT OF THE INVENTION

The object of this invention is to provide a method for determining the initial phase information of the m sequence suitable to the SSC method, which can be applied in a general manner both to the simple construction type and the modular type m sequence generators.

SUMMARY OF THE INVENTION

In order to achieve this object a method for determining the initial state of the m sequence generator in an SSC system according to this invention, as described at the beginning of this specification, is characterized in that the initial state of shift registers constituting the m sequence generator is determined by the following equation;

$$y_j(0) = \begin{vmatrix} q_{11} & & q_{1n} \\ \cdot & & \cdot \\ \cdot & \ldots \widetilde{X} \ldots & \cdot \\ \cdot & & \cdot \\ q_{n1} & & q_{nn} \end{vmatrix},$$

where
$j = 1, \ldots, n$,
$y_j(0)$ is the j-th element of $Y(0)$ and
$\widetilde{X} = PX(O)$.

The shift registers described above may be either simple construction type or modular type.

An algorithm for determining the initial phase information, which can be applied in a general manner both to the simple construction type and the modular type m sequence generators is proposed so that a communication channel can be divided by determining previously the initial phase on the sender and the receiver sides.

These and other objects and advantages of the present invention will become apparent by reference to the following description and drawings.

DETAILED DESCRIPTION

All the following calculations are effected according to the Boolean algebra.

Figure 1:
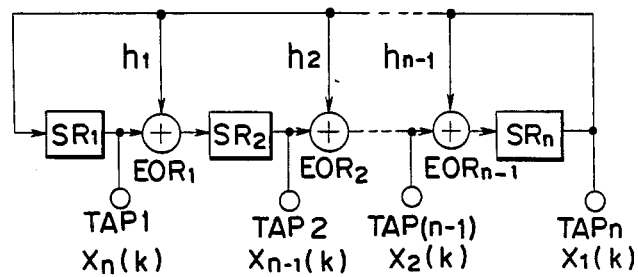
FIGS. 1 and 2 are block diagrams illustrating the construction of a modular type m sequence generator.
Figure 2:
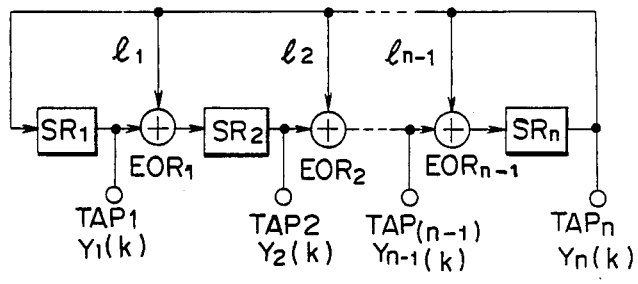
Figure 3:
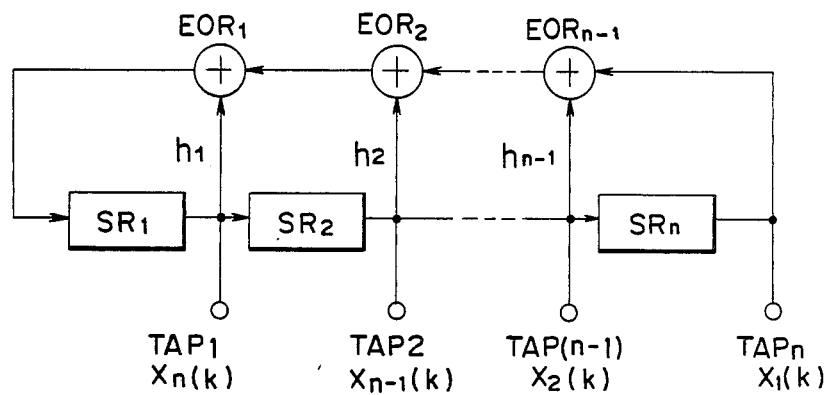
FIGS. 3 and 4 are block diagrams illustrating the construction of a simple construction type m sequence generator.
Figure 4:
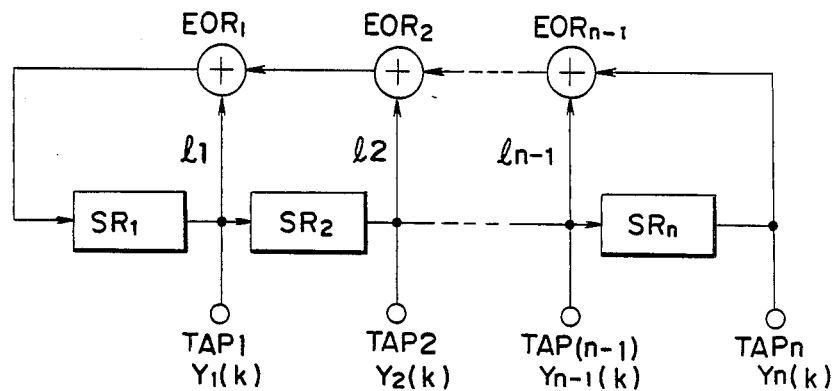

(a) Equation of state representing the initial state of shift registers constituting the m seuqence generator Models representing m sequence generators on the sender and the receiver sides, respectively, are indicated in FIGS. 1 to 4 for those of modular type (FIGS. 1 and 2) and for those of simple construction type (FIGS. 3 and 4). FIGS. 1 and 3 show the construction on the sender side and FIGS. 2 and 4 the construction on the receiver side. In the figures, $SR_1 \sim SR_n$ represent flip-flops; $EOR_1 \sim EOR_{n-1}$ exclusive OR gates; and $TAP_1 \sim TAP_n$ terminals to which signals described below for setting the initial state of the m sequence generator are applied, which signals are given by a computer not shown in the figures. It is supposed that communication is performed between two devices having a same construction.

At this time the equation of state of the shift registers can be written with respect to the dispersion time k, as follows;

<On the sender side> for $\forall k$ $$X(k+1) = AX(k), X(k) \neq 0 \qquad (1)$$

<On the receiver side> for $\forall k$ $$Y(k+1) = BX(k), Y(k) \neq 0 \qquad (2)$$

where $X(k)$ and $Y(k)$ are given by the following equations;

$$X(k) = \begin{bmatrix} x_1(k) \\ \cdot \\ \cdot \\ \cdot \\ x_\eta(k) \end{bmatrix}, Y(k) = \begin{bmatrix} y_1(k) \\ \cdot \\ \cdot \\ \cdot \\ y_\eta(k) \end{bmatrix}$$

and A and B are
in the case of the modular type $$A = \begin{bmatrix} h_{\eta-1} & & & \\ \vdots & & I_{\eta-1} & \\ \vdots & & & \\ h_1 & & & \\ 1 & 0 & \ldots & 0 \end{bmatrix},$$

$$B = \begin{bmatrix} 0 & \ldots & 0 & 1 \\ & & & l_1 \\ & & & \vdots \\ & I_{\eta-1} & & \vdots \\ & & & \vdots \\ & & & l_{\eta-1} \end{bmatrix},$$

in the case of the simple construction type $$A = \begin{bmatrix} 0 & & & \\ \vdots & & I_{\eta-1} & \\ \vdots & & & \\ 0 & & & \\ 1 & h_{\eta-1} & \ldots & h_1 \end{bmatrix},$$

$$B = \begin{bmatrix} l_1 & \ldots & l_{\eta-1} & 1 \\ & & & 0 \\ & & & \vdots \\ & I_{\eta-1} & & \vdots \\ & & & \vdots \\ & & & 0 \end{bmatrix}.$$

In Eqs. (1) and (2), n represents the number of stages of the shift registers (hereinbelow abbreviated to SR); $X(k)$ and $Y(k)$ the state vector of the SR ($n \times 1$); A and B the state transition matrix of the SR ($n \times n$); and $I_{n-1}$ is a unit matrix $(n-1) \times (n-1)$. Further, $h_j$, $l_j$ ($j=1, \ldots, n-1$) indicate the state of the feedback line and feedbak "ON"→$h_j$, $l_j=1$, feedback "OFF"→$h_j$, $l_j=0$.

Furthermore A and B have the following properties;

(i)
$$A^N = B^N = I_n$$

$N = 2^n - 1$ (length of code sequence)

(ii) $A^{-1} = B$, $B^{-1} = A$ (b) Expression of the m sequence (1 period long) outputted by $TAP_1$ Supposing that $X(O)$ and $Y(O)$ represent the initial state of the SR on the sender and the receiver sides, the sent and the received code patterns U and W, respectively, outputted by $TAP_1$ ($i=1 \sim n$) at $k=0 \sim N-1$ can be represented as follows;

<On the sender side>

$$U = \begin{bmatrix} c^T X(0) & \leftarrow k = 0 \\ c^T A X(0) & \leftarrow k = 1 \\ \vdots & \vdots \\ c^T A^{N-1} X(0) & \leftarrow k = N-1 \end{bmatrix} \quad (3)$$

$$c^T = [0 \ldots 0 \ 1 \ 0 \ldots 0]$$
$\uparrow$
$(n - i + 1)$-th element

Figure 5:
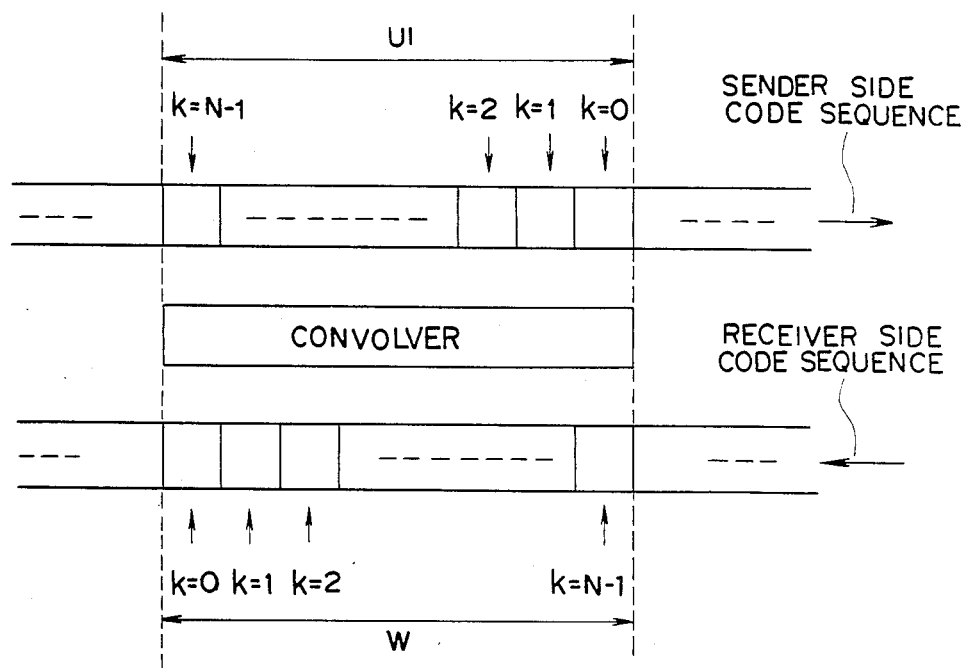
FIG. 5 is a scheme showing the phase relation between the sent and received m sequences.

<On the receiver side>

$$W = \begin{bmatrix} d^T B^{N-1} Y(0) & \leftarrow k = N-1 \\ \vdots & \vdots \\ d^T B X(0) & \leftarrow k = 1 \\ d^T Y(0) & \leftarrow k = 0 \end{bmatrix} \quad (4)$$

$$d^T = [0 \ldots 0 \ 1 \ 0 \ldots 0]$$
$\uparrow$
$i$-th element (c) Deduction of $Y(O)$ The method according to this invention is applied to the dividing method I in the application described previously. The phase relation between the m code sequences on the sender and the receiver sides for realizing the dividing method I is shown in FIG. 5. That is, using $U = W$, $$PX(O) = QY(O) \quad (5)$$

where $$P = \begin{bmatrix} (n - i + 1)\text{-th line of } I_\eta \\ (n - i + 1)\text{-th line of } A \\ \vdots \\ (n - i + 1)\text{-th line of } A^{\eta-1} \end{bmatrix},$$

$$Q = \begin{bmatrix} i\text{-th line of } A \\ i\text{-th line of } A^2 \\ \vdots \\ i\text{-th line of } A^\eta \end{bmatrix} = \begin{bmatrix} q_{11} & \ldots & q_{1\eta} \\ \vdots & & \vdots \\ q_{\eta 1} & \ldots & q_{\eta\eta} \end{bmatrix}$$

are valid and $Y(O)$ can be obtained analytically, as indicated by Eq. (6) by using Cramer's formular.

$$y_j(0) = \begin{vmatrix} q_{11} & & q_{1\eta} \\ \vdots & \ldots \widetilde{X} \ldots & \vdots \\ q_{\eta 1} & & q_{\eta\eta} \end{vmatrix}, \quad (6)$$

$\Uparrow$
$j$-th row where
yj(0) is the j-th element of Y(O) and
$\tilde{X}=PX(O)$.

Figure 6:
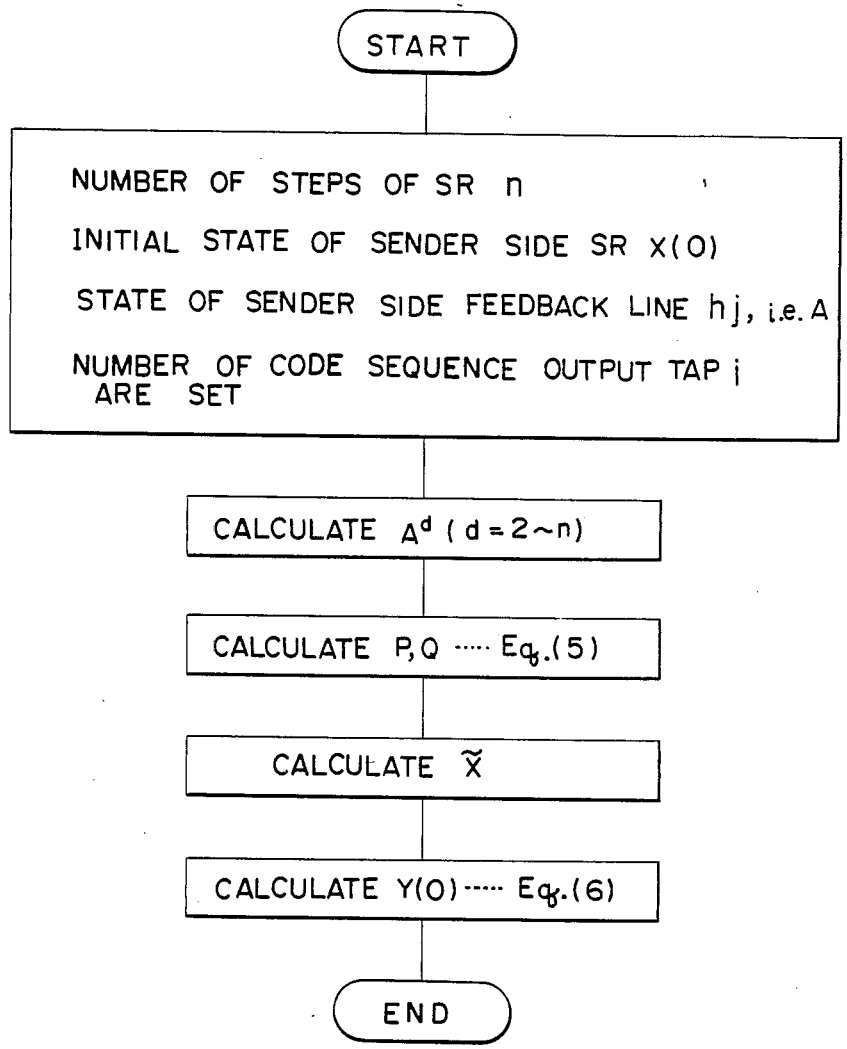
FIG. 6 is a flow chart showing the procedure according to this invention for determining the initial phase information.

As explained above, the procedure for obtaining Y(O) can be summarized as indicated in FIG. 6.

Furthermore the calculations of the exponential of the matrix A in FIG. 6 can be performed simply by using Eqs. (24) and (28) in the application stated previously in the case of the simple construction type m sequence generator and by using the following Eqs. (7) and (8) in the case of the modular type m sequence generator.

Calculation algorithm of $A^d <I>$ used in the case of $d \leq N/2$ (i) For the 2nd~n-th rows of $A^d$ the 1st~(n−1)-th rows are shifted as they are.

(ii) The 1st row of $A^{d-1}$ can be obtained by the following calculation.

$$(n\text{-th row of } A^{d-1}) \oplus \sum_{j=1}^{\eta-1} h_{\eta-j} (j\text{-th row of } A^{d-1}) \qquad (7)$$

where $d = 2 \sim N - 1 (\because N = 2^\eta - 1)$

Calculation algorithm of $A^2 <II>$ used in the case of $d > N/2$ (i) For the 1st~(n−1)-th rows of $B^r(=A^d)$ the 2nd~n-th rows are shifted as they are.

(ii) The n-th row of $B^r(=A^d)$ can be obtained by the following calculation.

$$(1\text{st row of } B^{r-1}) \oplus \sum_{j=2}^{\eta-1} 1_{j-1} (j\text{-th row of } B^{r-1}) \qquad (8)$$

where $r = 1 \sim N - 2, r = N - d$.

As explained above, according to this invention, since the communication channel can be divided by determining previously the initial phase of the m code sequencies both on the sender and the receiver sides by the procedures from (a) to (c) as described above, it is possible to divide the communication channel even by using a same m code sequence at the sender and at the receiver. Therefore the number of communication channels can be remarkably increased so that multiusers can be sufficiently satisfied. The method according to this invention can be applied to the simple construction type m sequence generator as well as to the modular type m sequence generator.

While particular embodiments of the invention have been shown and described, it will be obvious to those skilled in the art that various changes and modifications may be made without departing from the present invention in its broader aspect.

The embodiments of the invention in which an exclusive property or privilege is claimed are defined as follows:

1. A spread spectrum communication system, by which demodulation of necessary information is effected by correlation output between signals for which spectrum of information signals is spread by using a maximum length linearly occurring code sequence on the sender side and a maximum length linearly occurring code sequence generated on the receiver side, wherein the initial state of shift registers constituting the maximum length linearly occurring code sequence generator is determined by the following equation;

$$y_j(0) = \begin{vmatrix} q_{11} & & q_{1n} \\ \vdots & \ldots \tilde{X} \ldots & \vdots \\ q_{n1} & & q_{nn} \end{vmatrix},$$

$j=1,\ldots,n$
where
yj(0) is the j-th element of Y(O),
$\tilde{X}$ is the j-th row,
and
$\tilde{X}=PX(O)$.

2. A spread spectrum communication system according to claim 1, wherein said maximum length linearly occurring code sequence generator includes a plurality of flip-flops which each have a data input and a data output, and a plurality of exclusive OR gates which each have first and second data inputs and a data output, a first of said flip-flops having its data output coupled to said first data input of each said gate and to the data input of a second of said flip-flops, each said gate having its second data input coupled to the data output of a respective said flip-flop other than said first flip-flop, and each said gate having its data output coupled to the data input of a respective said flip-flop other than said second flip-flop.

3. A spread spectrum communication system according to claim 1, wherein said maximum length linearly occurring code sequence generator includes a plurality of flip-flops which each have a data input and a data output, and a plurality of exclusive OR gates which each have first and second data inputs and a data output, a first said flip-flop having its data output coupled to the first data input of a first said gate, a second said gate having its data output coupled to the data input of a second said flip-flop, each said flip-flop other than said first flip-flop having its data output coupled to the second data input of a respective one of said gates and coupled to the data input of a respective one of said flip-flops other than said second flip-flop, and each said gate other than said second gate having its data output coupled to the first data input of a respective one of said gates other than said first gate.

* * * * *